United States Patent
Chandna et al.

(10) Patent No.: US 11,055,320 B2
(45) Date of Patent: Jul. 6, 2021

(54) SYSTEM FOR MAPPING EMPLOYEES SENTIMENTS AND A METHOD THEREOF

(71) Applicant: Zensar Technologies Ltd., Maharashtra (IN)

(72) Inventors: Udit Chandna, Delhi (IN); Sandeep Kishore, Fremont, CA (US); Kapil Bharti, San Jose, CA (US); Ullas Balan Nambiar, Bangalore (IN)

(73) Assignee: Zensar Technologies Ltd., Maharashtra (IN)

( * ) Notice: Subject to any disclaimer, the term of this patent is extended or adjusted under 35 U.S.C. 154(b) by 141 days.

(21) Appl. No.: 16/210,828

(22) Filed: Dec. 5, 2018

(65) Prior Publication Data

US 2019/0179834 A1 Jun. 13, 2019

(30) Foreign Application Priority Data

Dec. 7, 2017 (IN) .............................. 201721044011

(51) Int. Cl.
| | | |
|---|---|---|
| *G06F 16/28* | (2019.01) | |
| *G06N 20/00* | (2019.01) | |
| *G06Q 10/06* | (2012.01) | |
| *G06F 16/951* | (2019.01) | |

(52) U.S. Cl.
CPC .......... *G06F 16/285* (2019.01); *G06F 16/951* (2019.01); *G06N 20/00* (2019.01); *G06Q 10/06393* (2013.01)

(58) Field of Classification Search
None
See application file for complete search history.

(56) References Cited

U.S. PATENT DOCUMENTS

| | | | | |
|---|---|---|---|---|
| 9,747,282 | B1* | 8/2017 | Baker | ..................... G06F 40/58 |
| 2009/0287642 | A1* | 11/2009 | Poteet | .................... G06Q 30/02 |
| 2014/0122355 | A1* | 5/2014 | Hardtke | ............... G06Q 10/105 |
| | | | | 705/321 |

(Continued)

OTHER PUBLICATIONS

Blackard, Kirk. "Assessing Workplace Conflict Resolution Options." Dispute Resolution Journal. Feb./Apr. 2001. (Year: 2001).*

*Primary Examiner* — Susanna M. Diaz

(74) *Attorney, Agent, or Firm* — Hamre, Schumann, Mueller & Larson, P.C.

(57) ABSTRACT

The present disclosure relates to the field of a system that maps employees' sentiments, and envisages a system for mapping employees' sentiments comprising a database, an input unit, a parser, a filter unit, a lexical analyse), an identifier, a mapping unit, an aggregator, a sentiments analyser, and a computation unit. The employee inputs are received through the input unit. The parser parses the inputs and generates tokens that are filtered based on the filter unit. Keywords are extracted from pre-determined list of keywords based on filtered words which are mapped with pre-determined group of themes and quantitative score based on the weightage score is computed by pre-determined weightage scores. The sentiments analyser analyses employee sentiments, based on quantitative score and computation unit computes a relationship between employee sentiments, employee feedback and employee performance.

13 Claims, 3 Drawing Sheets

(56) References Cited

U.S. PATENT DOCUMENTS

Figure 1:
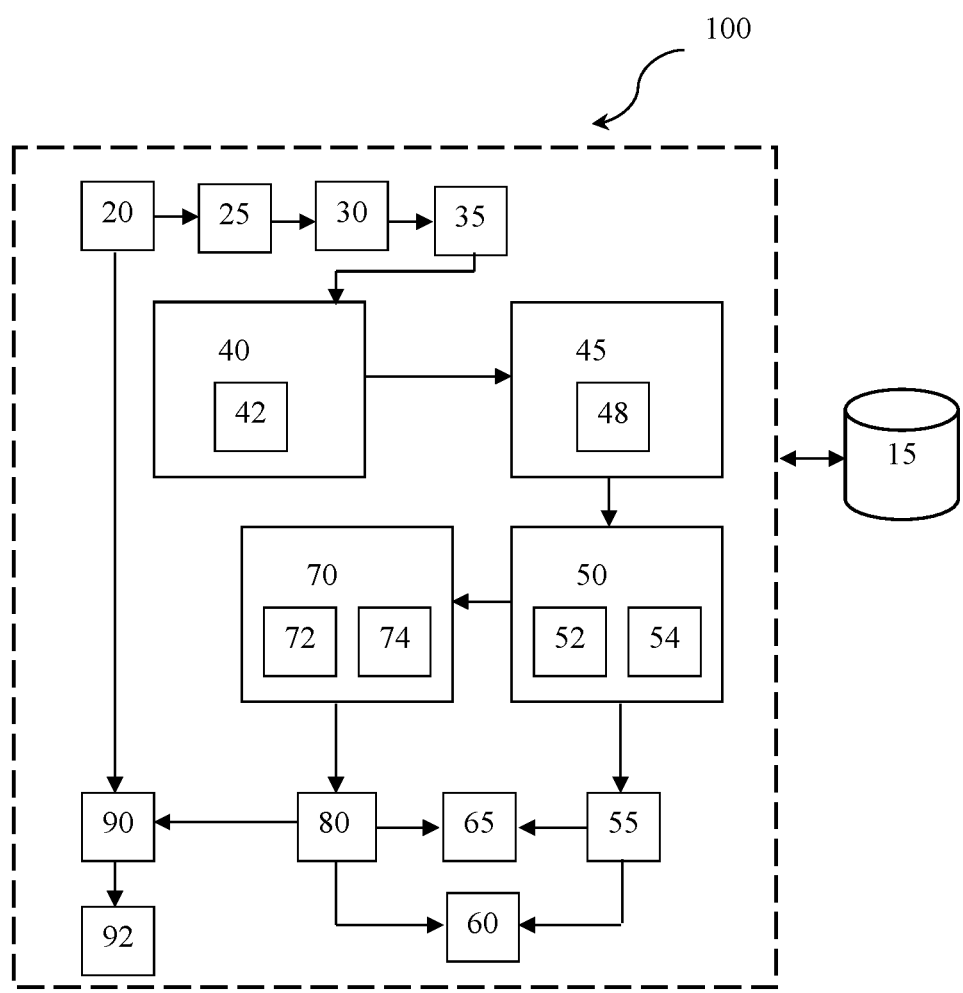

| | | | |
|---|---|---|---|
| 2014/0280510 A1* | 9/2014 | Putnam | H04L 67/10 |
| | | | 709/203 |
| 2017/0193397 A1* | 7/2017 | Kottha | G06N 20/00 |
| 2017/0242919 A1* | 8/2017 | Chandramouli | G06F 16/3344 |
| 2018/0025743 A1* | 1/2018 | Childress | G10L 25/63 |
| | | | 704/205 |

* cited by examiner

SYSTEM FOR MAPPING EMPLOYEES SENTIMENTS AND A METHOD THEREOF

FIELD

The present disclosure relates to the field of a system that maps and scores employees' sentiments.

Definitions

As used in the present disclosure, the following terms are generally intended to have the meaning as set forth below, except to the extent that the context in which they are used indicates otherwise.

The expression "organization" used hereinafter in this specification refers to, but is not limited to, an entity comprising multiple individuals working towards a collective goal.

The expression "employee(s)" used hereinafter in this specification refers to, but is not limited to, a worker(s) working within the organization, and will include any team member working in a team in a defined area.

The expression "themes" used hereinafter in this specification refers to, but is not limited to, activities/procedures taking place under different departments of an organization, which positively or negatively affects the motivation, productivity, commitment of the individuals of the organization.

The expression "sentiments" used hereinafter in this specification refers to, but is not limited to, condition of a state of mind of an individual in a group manifested by audio and/or text. The words spoken by an individual are captured on various recording devices as an analogue signal. Text signals are writings of an individual on any personal device associated with a user including a handheld device, smart phone, kiosk, laptop, desktop, palmtop, iPad, tablet, mobile application, and web application. Therefore, both audio and/or text are analogue signals which as disclosed in the specification are converted from analogue to digital signal.

The expression "stop words" used hereinafter in this specification refers to, but is not limited to, unwanted or irrelevant words.

These definitions are in addition to those expressed in the art.

BACKGROUND

Employee engagement is an essential part of a business environment. It is important for employers to engage with employees. These engagements can positively impact employee performance and lead to increased productivity and improved efficiency. By employee engagement activities, the organization tries to create mutually beneficial long term relationship by addressing concerns and measure and track sentiments of its employees. Many organizations lack the understanding of identifying let alone addressing employees' concerns and their sentiments for the well-being of the employees.

Conventionally, organizations practice once a year assessment model for employee engagement. Usually, surveys are mailed out to the employees, and employees have to mail the completed survey to an administrator, where the surveys are being analysed manually. This approach is time and cost intensive, and prone to error due its manual nature. In such assessment, employees are asked about their concerns, steps to be taken to improve satisfaction and engagement of the employees. Many employees do not take part in these surveys, due their time consuming nature, which further leads to incomplete or insufficient survey information. Also, it becomes difficult to track and act on the concerns of the each employee in the big organization owing to its large number of employees.

Therefore, there is felt a need for a system and method for mapping employees' sentiments.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a system and method for mapping employees' sentiments.

Another object of the present disclosure is to provide a system which classifies the employees' sentiments in various themes.

Yet another object of the present disclosure is to provide a system which tracks improvement in employees' satisfaction.

Still another object of the present disclosure is to provide a system which automatically maps employees' sentiments to group of themes.

Other objects and advantages of the present disclosure will be more apparent from the following description, which is not intended to limit the scope of the present disclosure.

These and other objects and advantages of the present invention will become readily apparent from the following detailed description taken in conjunction with the accompanying drawings.

SUMMARY

The present disclosure envisages a system for mapping employees' sentiments comprising a database, an input unit, a parser, a filter unit, a lexical analyser, an identifier, a mapping unit, an aggregator, a sentiments analyser, and a computation unit.

The database is configured to store a pre-determined group of themes and at least one pre-determined keyword corresponding to each of the themes, a pre-determined weightage corresponding to each of the keywords, a pre-determined set of scoring rules, a pre-determined list of stop words, and a pre-determined list of keywords. The input unit is configured to receive employee input.

The parser is configured to cooperate with the input unit, to generate tokens based on the employee input.

The filter unit is configured to cooperate with the database and the parser to filter out words, based on the pre-determined list of stop words and the tokens. The lexical analyser is configured to cooperate with the database and the filter unit to extract keywords from the pre-determined list of keywords based on filtered words. The identifier is configured to cooperate with the lexical analyser and the database to identify the pre-determined keywords corresponding to each of the themes based on the extracted keywords. The mapping unit is configured to cooperate with the identifier and the database to identify the pre-determined group of themes using the identified keywords, further configured to map the identified keyword to at least one of the pre-determined group of themes.

The aggregator is configured to cooperate with the mapping unit and the database to compute a weighted score for each of the identified keyword corresponding to the mapped group of themes using the pre-determined weightage, and is further configured to compute a quantitative score for each of the mapped group of themes based on the weighted score and the pre-determined set of scoring rules. The sentiments analyser is configured to cooperate with the aggregator to analyse the employee sentiments, based on the quantitative score. The computation unit is configured to cooperate with the sentiments analyser to compute a relationship between the employee sentiments, employee feedback and employee performance related to the employee, provided through a user device associated with upper management, The parser, filter unit, lexical analyser, identifier, mapping unit, aggregator, sentiments analyser and computation unit is implemented using one or more processor(s).

In an embodiment, the identifier includes a first crawler and extractor configured to cooperate with the lexical analyser and the database to crawl through pre-determined keyword corresponding to each of themes using the extracted keywords, and is further configured to identify at least one keyword.

In another embodiment, the mapping unit includes a second crawler and extractor configured to cooperate with the identifier and the database to identify a pre-determined group of themes using identified keyword, and is further configured to map identified keyword to at least one of the pre-determined group of themes.

In yet another embodiment, the aggregator includes a weightage unit and a scoring unit. The weightage unit is configured to cooperate with the mapping unit and the database to compute a weighted score for each of identified keywords corresponding to the mapped group of themes using the pre-determined weightage. The scoring unit is configured to cooperate with the weightage unit to compute a quantitative score for each of the mapped group of themes based on the weighted score.

In still another embodiment, the lexical analyser includes a machine learning unit that self-learns and adds new keywords to the pre-determined list of keywords.

In yet another embodiment, each theme of the pre-determined group of themes is categorized into a tier.

In an embodiment, the employee input can be in the form of text or audio. To convert audio to text, an analogue to digital converter is used.

In another embodiment, a forecasting unit is configured to cooperate with the sentiments analyser, the user device and the database to forecast employability of the employee, based on the employee sentiments, the employee performance and pre-determined set of forecasting rules, stored in the database.

In an embodiment, an issue analyser is configured to cooperate with the aggregator to identify issues based on the quantitative score and is further configured to transmit issues to the user device.

In another embodiment, the issue analyser includes an issue identifier configured to cooperate with the aggregator to identify issues based on the quantitative score. A communicator is configured to cooperate with the issue identifier to transmit the identified issues to the user device.

In still another embodiment, the user device is configured to receive an issue resolved input from the upper management. The user device is configured to generate a notification signal upon receiving the issue resolved input.

In yet another embodiment, the system includes a feedback unit configured to cooperate with the user device, to facilitate the employee to provide the feedback upon receiving the notification signal via the input unit. A satisfaction score unit is configured to cooperate with the feedback unit and the database to compute an employee satisfaction score, based on the feedback and the pre-determined scoring rules.

In an embodiment, the source of the employee input is selected from the group, not limited to, consisting of hand-held device, smart phone, kiosk, laptop, desktop, palmtop, iPad, tablet, mobile application, and web application.

The present disclosure envisages a method for mapping employees' sentiments.

BRIEF DESCRIPTION OF THE ACCOMPANYING DRAWING

Figure 2A:
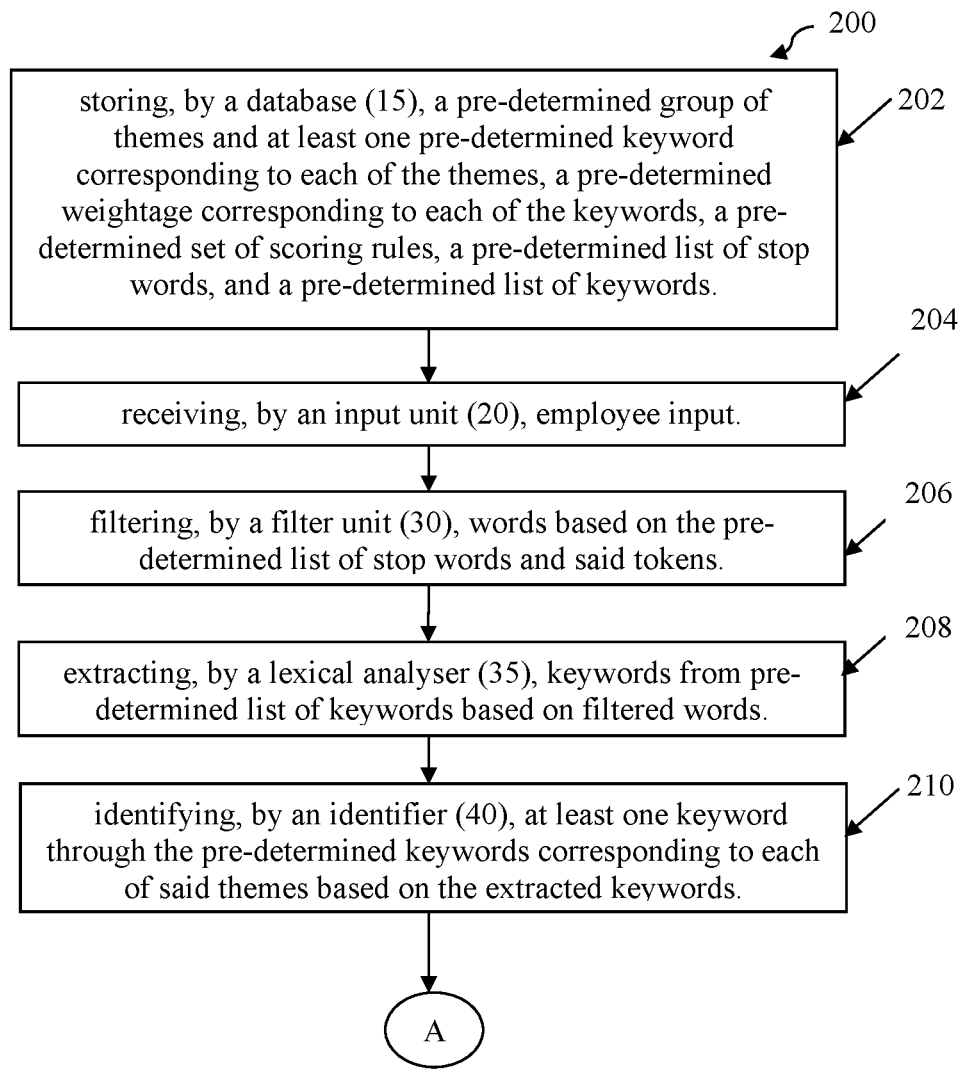
Figure 2B:
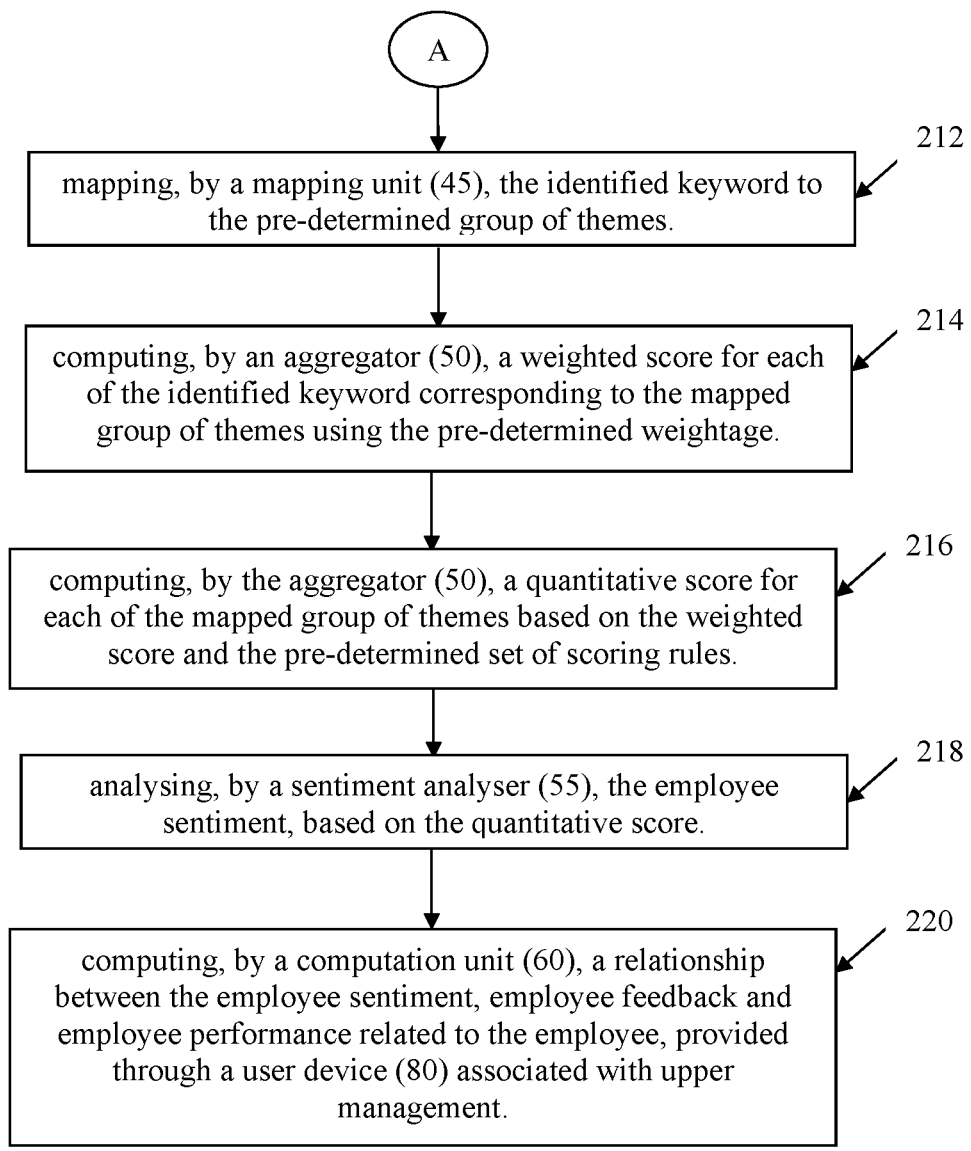

A system and method for mapping employees' sentiments of the present disclosure will now be described with the help of the accompanying drawing, in which:

FIG. 1 illustrates a block diagram of a system for a system for mapping employees' sentiments; and FIGS. 2a and 2b illustrate a flow chart of a method for mapping employees' sentiments.

LIST AND DETAILS OF REFERENCE NUMERALS USED IN THE DESCRIPTION AND DRAWING

| Reference Numeral | Reference |
| --- | --- |
| 100 | System |
| 15 | Database |
| 20 | Input unit |
| 25 | Parser |
| 30 | Filter unit |
| 35 | Lexical analyser |
| 40 | Identifier |
| 42 | First crawler and extractor |
| 45 | Mapping unit |
| 48 | Second crawler and extractor |
| 50 | Aggregator |
| 52 | Weightage unit |
| 54 | Scoring unit |
| 55 | Sentiments analyser |
| 60 | Computation unit |
| 65 | Forecasting unit |
| 70 | Issue analyser |
| 72 | Issue identifier |
| 74 | Communicator |
| 80 | User device |
| 90 | Feedback unit |
| 92 | Satisfaction score unit |

DETAILED DESCRIPTION OF THE INVENTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, units, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on," "engaged to," "connected to," or "coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Terms such as "inner," "outer," "beneath," "below," "lower," "above," "upper," and the like, may be used in the present disclosure to describe relationships between different elements as depicted from the figures.

The various embodiments of the present invention provide a system and method for mapping employees' sentiments.

FIG. 1 illustrates a block diagram of a system for mapping employees' sentiments. The system comprises a database (15), an input unit (20), a parser (25), a filter unit (30), a lexical analyser (35), an identifier (40), a mapping unit (45), an aggregator (50), a sentiments analyser (55), a computation unit (60), a forecasting unit (65), an issue analyser (70), a user device (80), a feedback unit (90), and a satisfaction score unit (92).

The database (15) is configured to store a pre-determined group of themes and at least one pre-determined keyword corresponding to each of the themes, a pre-determined weightage corresponding to each of the keywords, a pre-determined set of scoring rules, a pre-determined list of stop words, and a pre-determined list of keywords.

The input unit (20) is configured to receive employee input. The employee input can be in the form of text or audio. To convert audio to text, an analogue to digital converter is used. In an embodiment, the source of the employee input is selected from the group, not limited to, consisting of handheld device, smart phone, kiosk, laptop, desktop, palmtop, iPad, tablet, mobile application, and web application.

The parser (25) is configured to cooperate with the input unit (20), to generate tokens based on the employee input.

The filter unit (30) is configured to cooperate with the database (15) and the parser (25) to filter out words, based on the pre-determined list of stop words and the tokens. The lexical analyser (35) is configured to cooperate with the database (15) and the filter unit (30) to extract keywords from the pre-determined list of keywords based on filtered words. The lexical analyser (35) includes a machine learning unit that self-learns and adds new keywords to the pre-determined list of keywords.

The identifier (40) is configured to cooperate with the lexical analyser (35) and the database (15) to identify the pre-determined keywords corresponding to each of the themes based on the extracted keywords.

The mapping unit (45) is configured to cooperate with the identifier (40) and the database (15) to search through the pre-determined group of themes using the identified keywords, and is further configured to map the identified keyword to at least one of the pre-determined group of themes.

In yet another embodiment, each theme of the pre-determined group of themes is categorized into a tier.

Table 1 below illustrates an example of different pre-determined group of themes. Super-theme (Tier 0) illustrates a broadest theme and Sub-theme (Tier 2) illustrates a narrower theme.

TABLE 1

| (Tier 0) | (Tier 1) | (Tier 2) | Keywords |
|---|---|---|---|
| Operations | Admin & Facilities | Canteen | Canteen |
| | | | Cafeteria |
| | | | Food |
| | | | Clean |
| | | | Cleanliness |
| | | Transportation | Bus |
| | | | Seating |
| | | | Seater |
| | | | Parking |
| | | | Commute |
| | | Medical | first aid |
| | | | Doctor |
| | | | Columbia Asia |
| | | Facilities | Rooms |
| | | | Toilets |
| | | | Washroom |
| | | | Odc |
| | | | Funzone |
| | | | Coffee |
| | Visa & Travel | Global Mobility | L1 |
| | | | B1 |
| | | | US |
| | | | America |
| | | | H1 |
| | | | Trump |
| | | | UK |
| | | Immigration | visa |
| | | | passport |
| | | | immigration |
| | | | international |
| | | | travel |
| | | | kenya |
| | | | durban |
| | | | johannesburg |
| Business Enablement | IT & Infosec | IT Accessories | printer |
| | | | internet |
| | | | wifi |
| | | | laptop |
| | | | connectivity |
| | | Network | network |
| | | | outage |
| | | | wi-fi |
| | | | wireless |
| | | | tims |
| | | | infosec |
| | | | security |
| | | | passsword |
| | | | iso |
| | | | audit |
| | | | email |
| | | | mail |
| | | | outlook |
| | | Software | ms office |
| | | | ms word |
| | | | software |
| | | | hardware |
| | | | server |

TABLE 1-continued

| (Tier 0) | (Tier 1) | (Tier 2) | Keywords |
|---|---|---|---|
|  |  | Technology | SAP |
|  |  | SAP | Oracle |
|  |  | Oracle | endeca |
|  |  |  | digital marketing |
|  |  |  | atg |
|  |  | Traditional Technologies | dotnet |
|  |  |  | .net |
|  |  |  | platinum partner |
|  |  | Bots | bot |
|  |  |  | chatbots |
|  |  |  | c++ |
|  |  |  | rpa |
|  |  |  | Robotic Process |
|  |  | AI | AI |
|  |  |  | machine learning |
|  |  |  | Analytics |
| Finance | Individual Salary & Taxes | Salary & Pension | salary |
|  |  |  | payroll |
|  |  |  | Paysquare |
|  |  | Tax | tds |
|  |  |  | income tax |
|  |  |  | form 16 |
|  |  |  | financial |
|  |  |  | expenses |
|  |  | Pension | Pension |
| HR | Recruitment & Attrition | Recruitment | human resource |
|  |  |  | hr |
|  |  |  | rmg |
|  |  |  | hiring |
|  |  |  | appraisal |
|  |  |  | bench |
|  |  |  | lateral |
|  |  |  | gmr |
|  |  |  | hire |
|  |  |  | IJP |
|  |  |  | naukri |
|  |  |  | trainee |
|  |  | Attrition | Talent Development |
|  |  |  | Talent Development |
|  | Talent Development | L&D | learn |
|  |  |  | training |
|  |  |  | learning |
|  |  |  | courses |
|  |  |  | zenlearn |
|  |  |  | zen learn |
|  |  |  | exit portal |
|  | Compensation & Performance Management | performance management | pmo |
|  |  |  | performance management |
|  |  | Appraisal | appraisal |
|  |  |  | promotion |
|  |  |  | rating |
|  |  |  | compensation |
|  | Employee Policies & Services | Policy | policy |
|  |  | Leave | leave |
|  |  | Dress | dress |
|  |  |  | dress code |
|  |  | Attendance | swipe |
|  |  |  | swipe in |
|  |  |  | swipe out |
|  |  |  | attendance |

The aggregator (50) is configured to cooperate with the mapping unit (45) and the database (15) to compute a weighted score for each of the identified keyword corresponding to the mapped group of themes using the pre-determined weightage, and is further configured to compute a quantitative score for each of the mapped group of themes based on the weighted score and the pre-determined set of scoring rules.

The aggregator (50) includes a weightage unit (52) and a scoring unit (54). The weightage unit (52) provides a weightage score to each of the word present in the tokens based on the pre-determined weightage for each keyword. For example, an employee 1 has posted that the canteen food is shitty on an organization's social platform. The weightage unit (52) provides a weightage score to the word "shitty" as 1, based on the pre-determined weightage. The employee 2 has written about the cleanliness of the canteen and used the word "filthy" in his review on the social media platform. The weightage unit (52) provides a weightage score to the word "filthy" a weightage score of 2.

The scoring unit (54) is configured to cooperate with the weightage unit (52) to compute the quantitative score for each of the mapped group of themes based on the weighted score.

Table 2 illustrates an example of the quantitative scores for each of the group of themes.

TABLE 2

| (Tier 0) | (Tier 1) | (Tier 2) | Keywords |
|---|---|---|---|
| Operations (+5) | Admin & Facilities (0) | Canteen (+3) | Canteen (+2) |
|  |  |  | Cafeteria (+3) |
|  |  |  | Food (+1) |
|  |  |  | Clean (−2) |
|  |  |  | Cleanliness (−1) |
|  |  | Transportation (−6) | Bus (−3) |
|  |  |  | Seating (−5) |
|  |  |  | Seater (NA) |
|  |  |  | Parking (−4) |
|  |  |  | Commute (NA) |
|  |  | Medical (+1) | first aid (−1) |
|  |  |  | Doctor (+2) |
|  |  |  | columbia |
|  |  |  | asia (NA) |
|  |  | Facilities (+2) | Rooms (+2) |
|  |  |  | Toilets (−4) |
|  |  |  | Washroom (−2) |
|  |  |  | Odc (+2) |
|  |  |  | Funzone (+1) |
|  |  |  | Coffee (+3) |
|  | Visa & Travel (+5) | Global Mobility (+5) | L1 (−3) |
|  |  |  | B1 (−3) |
|  |  |  | US (+1) |
|  |  |  | America (+1) |
|  |  |  | H1 (+3) |
|  |  |  | Trump (+2) |
|  |  |  | UK (+4) |

The sentiments analyser (55) is configured to cooperate with the aggregator (50) to analyse employee sentiments, based on the quantitative score. The computation unit (60) is configured to cooperate with the sentiments analyser (55) to compute a relationship between the employee sentiments, employee feedback and employee performance related to the employee, provided through a user device (80) associated with upper management.

The forecasting unit (65) is configured to cooperate with the sentiments analyser (55), the user device (80) and the database (15) to forecast employability of the employee, based on the employee sentiments, the employee performance and pre-determined set of forecasting rules, stored in the database (15).

The issue analyser (70) is configured to cooperate with the aggregator (50) to identify issues based on the quantitative score and further configured to transmit the issues to the user device (80). The issue analyser (70) includes an issue identifier (72) and a communicator (74). The issue identifier (72) is configured to cooperate with the aggregator unit (60) to identify issues based on the quantitative score. The communicator (74) is configured to cooperate with the issue identifier (72) to transmit the identified issues to the user device (80).

In an embodiment, the issues help the upper management in prioritizing decision making, aggregation on recurring issues, and identifying the percentage of individual affected, in the organization.

The user device (80) is configured to receive an issue resolved input from the upper management, and is configured to generate a notification signal upon receiving the issue resolved input.

The feedback unit (90) is configured to cooperate with the user device (80), to facilitate employee to provide feedback upon receiving the notification signal via the input unit (20).

The satisfaction score unit (92) is configured to cooperate with the feedback unit (90) and the database (15), to compute employee satisfaction score, based on the feedback and the pre-determined scoring rules.

In an embodiment, the satisfaction score unit (92) is configured to compute the employee satisfaction score using the following formula:

$$Cp_i = \alpha A_i$$

where, $Cp_i$=Employee sentiments post $i^{th}$ action received by feedback unit $A_i$=Actions taken by higher management for $i^{th}$ grievances where, $\alpha = f(P_i, T_i)$ $P_i$=Percentage of employees impacted by the actions taken by the higher management $T_i$=Time taken to close the grievance In an embodiment, the $Cp_i$ can be defined as "the linear correlation between the employee sentiments and the upper management action".

The cumulative employee satisfaction score is defined as follows:

$$Cp = \Sigma_i^n \beta_i * Cp_i$$

where, $\beta_i = (P_i, T_i)$ $P_i$=Percentage of Employee Impact $T_i$=Time elapsed between the final feedback rating and action taken.

The parser (25), filter unit (30), lexical analyser (35), identifier (40), mapping unit (45), aggregator (50), sentiments analyser (55), a computation unit (60), a forecasting unit (65), an issue analyser (70), a user device (80), a feedback unit (90), and a satisfaction score unit (92) are implemented using one or more processor(s).

The processor is configured to cooperate with a memory to receive and process the set of pre-determined rules to obtain a set of system operating commands. The processor will be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute the set of predetermined rules stored in the memory to control units of the system (100).

In an embodiment, the memory is configured to store a set of pre-determined rules. The memory includes any computer-readable medium known in the art, including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes, and/or a cloud based FIGS. 2a and 2b illustrates a flowchart depicting a method for mapping employees' sentiments.

Step 202—Storing, by a database (15), configured to store a pre-determined group of themes and at least one pre-determined keyword corresponding to each of the themes, a pre-determined weightage corresponding to each of the keywords, a pre-determined set of scoring rules, a pre-determined list of stop words, and a pre-determined list of keywords.

Step 204—Receiving, by an input unit (20), employee input.

Step 206—Filtering, by a filter unit (30), words based on the pre-determined list of stop words and the tokens.

Step 208—Extracting, by a lexical analyser (35), keywords from pre-determined list of keywords based on filtered words.

Step 210—Identifying, by an identifier (40), at least one keyword through the pre-determined keywords corresponding to each of the themes based on the extracted keywords.

Step 212—Mapping, by a mapping unit (45), the identified keyword to the pre-determined group of themes.

Step 214—Computing, by an aggregator (50), a weighted score for each of the identified keyword corresponding to the mapped group of themes using the pre-determined weightage.

Step 216—Computing, by the aggregator (50), a quantitative score for each of the mapped group of themes based on the weighted score and the pre-determined set of scoring rules.

Step 218—Analysing, by a sentiments analyser (55), the employee sentiments, based on the quantitative score.

Step 220—Computing, by a computation unit (60), a relationship between the employee sentiments, employee feedback and employee performance related to the employee, provided through a user device (80) associated with upper management.

The foregoing description of the embodiments has been provided for purposes of illustration and not intended to limit the scope of the present disclosure. Individual workpieces of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of a system and method for mapping employees' sentiments which:

classifies the employees' sentiments in various themes;
tracks improvement in employee satisfaction; and
classifies the employees' sentiments as positive or negative.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

We claim:

1. A system (100) for mapping employees' sentiments, said system (100) comprising:
   a processor; and
   a memory storing a database (15) configured to store a pre-determined group of themes and at least one pre-determined keyword corresponding to each of said themes, a pre-determined weightage corresponding to each of said keywords, a pre-determined set of scoring rules, a pre-determined list of stop words, and a pre-determined list of keywords, and wherein the memory is coupled to the processor, and wherein the processor is capable of executing a set of instructions stored in the memory, and wherein the set of instructions comprising:
      receiving an employee input in an audio format and thereby converting the employee input received in the audio format to a textual format by using an analogue to digital converter;
      generating tokens based on said employee input;
      filtering out words, based on said pre-determined list of stop words and said tokens;
      extracting keywords, by using a lexical analysis technique, from said pre-determined list of keywords based on filtered words, wherein said pre-determined list of keywords is periodically updated with new keywords using a machine learning technique implemented in a manner such that the system (100) self-learns;
      crawling through said pre-determined keyword corresponding to each of said themes using said extracted keywords to identify at least one keyword;
      identifying said pre-determined keywords corresponding to each of said themes based on said extracted keywords;
      searching through said pre-determined group of themes using said identified keywords, further configured to map said identified keyword to at least one of said pre-determined group of themes;
      computing a weighted score for each of said identified keyword corresponding to said mapped group of themes using said pre-determined weightage, further configured to compute a quantitative score for each of said mapped group of themes based on said weighted score and said pre-determined set of scoring rules;
      analyzing employee sentiments, based on said quantitative score; and
      computing
         an employee satisfaction score based on a relationship between said employee sentiments, employee feedback and employee performance related to said employee, and
         a cumulative employee satisfaction score based on a percentage of employees impacted by actions taken, time elapsed between the employee feedback and the actions taken, and time spent on performing the actions.

2. The system (100) as claimed in claim 1, wherein said processor crawls through said pre-determined group of themes using said identified keywords, further configured to map said identified keywords to at least one of said pre-determined group of themes.

3. The system (100) as claimed in claim 1, wherein said processor further computes:
   said weighted score for each of said identified keywords corresponding to said mapped group of themes using said pre-determined weightage; and
   said quantitative score for each of said mapped group of themes based on said weighted score and said pre-determined set of scoring rules.

4. The system (100) as claimed in claim 1, wherein each theme of said pre-determined group of themes is categorized into a tier.

5. The system (100) as claimed in claim 1 wherein the processor further forecasts employability of said employee, based on said employee sentiments, said employee performance and pre-determined set of forecasting rules, stored in said database (15).

6. The system (100) as claimed in claim 1 wherein the processor further identifies issues based on said quantitative score, and further configured to transmit said issues onto a user device (80).

7. The system (100) as claimed in claim 6, wherein said user device (80) is configured to receive an issue resolved input from the upper management, said user device (80) configured to generate a notification signal upon receiving said issue resolved input.

8. The system (100) as claimed in claim 7, wherein the processor further facilitates employee to provide feedback upon receiving said notification signal via an input unit (20) and thereby computes an employee satisfaction score.

9. The system (100) as claimed in claim 8, wherein said input unit (20) and said user device (80) are at least one of handheld device, smart phone, kiosk, laptop, desktop, palmtop, iPad, and tablet, and wherein the user device (80) indicates a device carried by a user.

10. The system (100) as claimed in claim 8, wherein the employee satisfaction score is computed based on a linear correlation between the employee sentiments and actions taken by the higher management, and wherein the linear correlation is determined based on a set of parameters including employee sentiments, actions taken by the higher management, percentage of employees impacted by the actions taken, and time spent on performing the actions.

11. A method for mapping employees' sentiments said method comprising the following steps:

storing, by a processor in a database (15), a pre-determined group of themes and at least one pre-determined keyword corresponding to each of said themes, a pre-determined weightage corresponding to each of said keywords, a pre-determined set of scoring rules, a pre-determined list of stop words, and a pre-determined list of keywords;

receiving, by the processor, employee input in an audio format and thereby converting the employee input received in the audio format to a textual format by using an analogue to digital converter;

generating, by the processor, tokens based on said employee input;

filtering, by the processor, words based on said pre-determined list of stop words and said tokens;

extracting, by the processor, keywords, by using a lexical analysis technique, from said pre-determined list of keywords based on filtered words, wherein said pre-determined list of keywords is periodically updated with new keywords using a machine learning technique implemented in a manner such that the system (100) self-learns;

crawling, by the processor, through said pre-determined keyword corresponding to each of said themes using said extracted keywords to identify at least one keyword;

identifying, by the processor, at least one keyword through said pre-determined keywords corresponding to each of said themes based on said extracted keywords;

mapping, by the processor, said identified keyword to said pre-determined group of themes;

computing, by the processor, a weighted score for each of said identified keyword corresponding to said mapped group of themes using said pre-determined weightage;

computing, by the processor, a quantitative score for each of said mapped group of themes based on said weighted score; and analyzing, by the processor, said employee sentiments, based on said quantitative score;

computing, by the processor,
an employee satisfaction score based on a relationship between said employee sentiments, employee feedback and employee performance related to said employee, provided through a user device (80) associated with upper management, and
a cumulative employee satisfaction score based on a percentage of employees impacted by actions taken, time elapsed between the employee feedback and the actions taken, and time spent on performing the actions.

12. The method as claimed in claim 11 further comprising facilitating employee to provide feedback upon receiving a notification signal via an input unit (20) and computing an employee satisfaction score.

13. The method as claimed in claim 12, wherein the employee satisfaction score is computed based on a linear correlation between the employee sentiments and actions taken by the higher management, and wherein the linear correlation is determined based on a set of parameters including employee sentiments, actions taken by the higher management, percentage of employees impacted by the actions taken, and time spent on the performing the actions.

* * * * *